United States Patent [19]
Vaitkus et al.

[11] Patent Number: 5,629,482
[45] Date of Patent: May 13, 1997

[54] MEASURING DEVICE UTILIZING A THERMO-ELECTROMOTIVE ELEMENT

[75] Inventors: Rimantas Vaitkus, Vilnius, Lithuania; Shigenori Hayashi; Masaya Kadono, both of Kanagawa, Japan

[73] Assignee: Semiconductor Energy Laboratory Co., Ltd., Atsugi, Japan

[21] Appl. No.: 429,137

[22] Filed: Apr. 26, 1995

[30] Foreign Application Priority Data

Apr. 28, 1994 [JP] Japan .................... 6-113680

[51] Int. Cl.⁶ .................................................. G01F 1/68
[52] U.S. Cl. ............................ 73/204.24; 73/204.11
[58] Field of Search ......................... 73/204.24, 727, 73/204.11; 257/77, 414, 418

[56] References Cited

U.S. PATENT DOCUMENTS

| | | | |
|---|---|---|---|
| 4,478,077 | 10/1984 | Bohrer et al. | 73/204 |
| 4,938,244 | 7/1990 | Kumada et al. | 136/212 |
| 5,038,303 | 8/1991 | Kimura | 364/557 |
| 5,066,938 | 11/1991 | Kobashi et al. | 338/22 |
| 5,081,438 | 1/1992 | Nakahata et al. | 338/225 D |
| 5,251,981 | 10/1993 | Kreider | 136/238 |
| 5,303,594 | 4/1994 | Kurtz et al. | 73/727 |
| 5,362,975 | 11/1994 | Von Windheim et al. | 257/77 |
| 5,406,081 | 4/1995 | Inushima | 250/338 |

*Primary Examiner*—Richard Chilcot
*Assistant Examiner*—Max H. Noori
*Attorney, Agent, or Firm*—Sixbey, Friedman, Leedom & Ferguson, P.C.; Gerald J. Ferguson, Jr.; Eric J. Robinson

[57] ABSTRACT

To provide a flow rate sensor of minimized power consumption.

Form a Fe pattern 104 and Pt pattern 103 on the surface of a diamond thin film 101 by sputtering or evaporation to construct a thermo-electromotive element. Also, form a heating unit 102. On pulsewise heating from the heating unit 102, the temperature of the junction portions 109 becomes higher than that of the junction portions 110 and an output from the thermo-electromotive element is obtained as thermo-electromotive force between the electrodes 107 and 108. This output indicates a response characteristic reflecting the thermal effect exerted from the environment on the diamond thin film. From this output, for example, the flow rate of a fluid flowing in contact with the diamond thin film 101 can be obtained.

13 Claims, 8 Drawing Sheets

MEASURING DEVICE UTILIZING A THERMO-ELECTROMOTIVE ELEMENT

BACKGROUND OF THE INVENTION

1. Field of the Invention

The present invention refers to a measuring device capable of conducting the following measurements;

Measurement of the flow rate of a fluid;

Recognition of the kind of a fluid;

Measurement of the temperature of a fluid;

Measurement and detection of impurities contained in a fluid;

Evaluation of the thermal environment; and

Evaluation of the thermal effects.

2. Description of the Prior Art

A thermistor-using device is known as one for measuring the flow. In this apparatus, heat absorption by a fluid leading to a fall in the temperature of a thermistor section is used. Generally, because the heat quantity escaped from the thermistor section, when the thermistor section is in contact with a fluid, depends on the flow rate or flow velocity, the output of the thermistor bears a certain correlation to the flow rate, by the use of which correlation the flow rate can be computed from the output of the thermistor.

The flow rate is given by the product of the sectional area and flow velocity of a fluid. For example, assuming a fluid flows in a circular pipe having the inside diameter r at a flow velocity V, the flow rate becomes $V\pi r^2$. Hereinafter, description will be focused on the flow rate, but the flow rate and flow velocity can be simultaneously evaluated if the sectional area of the fluid is known.

Generally, the thermistor means a semiconductor having a large negative temperature coefficient. However, the thermistor originally means a thermally sensitive resistor and is not limited in particular by the positivity or negativity of a temperature coefficient or materials. Thus, metals, such as Pt, having a positive temperature coefficient may be called thermistors.

The elements using materials of temperature dependent resistance, like thermistors, are known generally as temperature measuring resistors or temperature sensitive elements, further as thermosensible elements or resistance thermometers. On the contrary, materials with temperature dependent resistance may be called those having a thermistor function. Hereinafter, materials with temperature dependent resistor will be referred to as temperature-measuring resistors.

Also, there is a system using a loss dependent on the flow rate in the quantify of heat from the relevant resistive heating unit on exposing a resistive heating unit heated by Joule's heat to a fluid. According to this system, the flow rate can be computed by measuring a current flowing through the resistive heating unit.

Further, there is another system in which allowing the quantity of heat to be absorbed by a fluid from a heating unit in contact with the fluid, the quantity of heat conveyed by the fluid is measured with a temperature-measuring resistor (e.g. Pt thermistor) provided separately.

In these systems, a greater quantity of heat absorbed by a fluid is effective for obtaining a higher sensitivity. And, to increasing a response speed, minimizing the heat capacity of a temperature-measuring resistor part is required.

The flow rate measuring device as indicated above have a drawback in that the measurable range of a flow rate is narrow, i.e., the dynamic range is narrow. Specifically, there is a problem in that an accurate measurement can be made only in the range between 20 sccm and 300 sccm or 200 sccm and 2000 sccm.

The inventors of the present invention considered that the above drawback is caused by the following problems:

(1) Since the temperature-measuring resistor is subjected to a thermally extremely unstable conditions, a response to heat is poor in linearity and cannot follow a wide range of thermal change.

(2) In conjunction with the above (1), especially a method for heating is difficult and no effective heating can be done in a wide range of flow rate.

(3) If the heat capacity of a temperature-measuring resistor is made smaller for increasing a response speed, a large quantity of heat cannot be dealt with.

The above (1) originates in that it is difficult to realize a structure capable of allowing the quantity of heat to be effectively absorbed by a fluid from a temperature-measuring resistor and simultaneously supplying the quantity of heat to the temperature-measuring resistor in a wide range of flow rate.

There is another problem that changes in temperature of an environment of the device or a fluid to be measured affects the operation of the device, for example, hindering the accuracy of the measurement.

Furthermore, if a battery drive considered, it becomes necessary to minimize the consumed power. For example, in the case of applying a flow rate measuring device to a household gas meter, it is required to enable a battery to operate as a power supply for more than several years. In such cases, a flow rate measuring device operable at a low power consumption is to be demanded. However, for a lower power consumption, there arises a new problem in that the measuring sensitivity and the measuring accuracy gives way and no required characteristic can be obtained.

SUMMARY OF THE INVENTION

The present invention has at least one object to solve the following problems:

To obtain a flow rate measuring device, high in measuring sensitivity or measuring accuracy and small in consumption power;

To obtain a flow rate measuring device, high in measuring sensitivity and small in consumption power;

To obtain a flow rate measuring device, high in measuring sensitivity;

To obtain a flow rate measuring device, small in consumption power;

In a device for measuring the thermal effect exerted on a thin film material, to heighten the measuring sensitivity and save the consumption power;

In a device for measuring the thermal effect exerted on a thin film material, to heighten the measuring sensitivity; and In a device for measuring the thermal effect exerted on a thin film material, to save the consumption power.

In accordance with the principle of the present invention, the measurment device comprises a thermo-electromotive force element provided on the surface of a diamond thin film, wherein the thermal effects on the diamond thin film exerted from the environment is output through the thermo-electromotive element.

In the above configuration, natural diamond, diamond obtained by the high-pressure synthesis, and diamond obtained by the vapor phase synthesis can be used as a diamond thin film.

The thermo-electromotive force element is an element using a thermo-electromotive effect (Seebeck effect). The thermo-electromotive effect is a phenomenon in which an electromotive force occurs in the circuit made up of two sorts of metals joined in a ring with the two junctions kept at different temperatures. This phenomenon occurs in a definite combination of metal-metal or metal-semiconductor.

Figure 1:
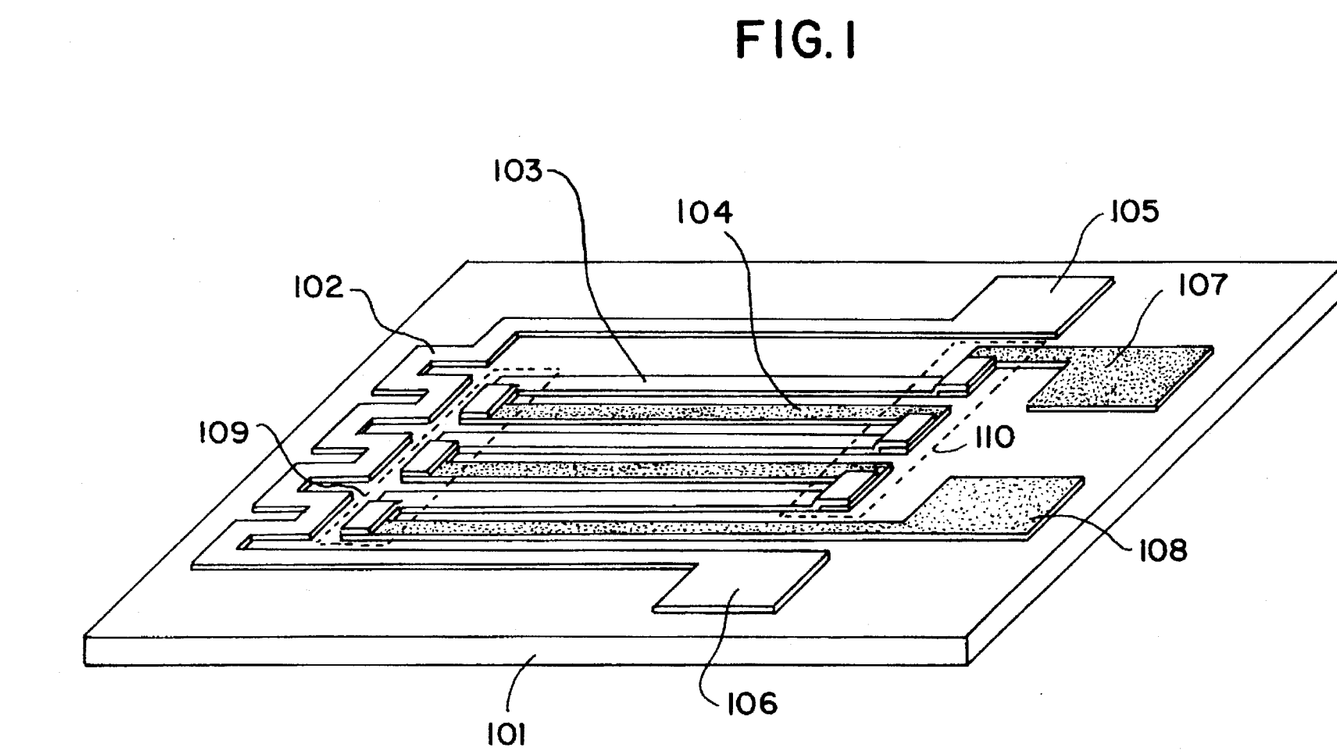
FIG. 1 shows the configuration of a sensor according to the embodiments 1 to 8.

An example of a thermo-electromotive element is shown in FIG. 1. In FIG. 1, a thermo-electromotive element comprising a Pt thin film pattern 103 and a Fe thin film pattern 104 are deposited on the surface of a diamond thin film 101 which is vapor-synthesized by a plasma CVD. The thermo-electromotive element shown in FIG. 1 takes a configuration of a series connection at three levels in which an electromotive force threefold that of a single level configuration is obtained. In the configuration shown in FIG. 1, a plurality of junction portions denoted by reference numeral 109 are heated by the heat generation of a heating unit 102 comprising a Pt thin film pattern and reached a higher temperature than a plurality of junction portions denoted by reference numeral 110, thereby generating a thermo-electromotive force between the electrodes 107 and 108.

As constituents of a thermo-electromotive element, combinations of Pt-Cr, Ni-Cr, Ni-constantan, Pt-constantan, Pd-Cr, Pd-constantan, and the like can be mentioned. It is important among these combinations to select one of constituent capable of providing a maximal thermo-electromotive force.

A thermo-electromotive element provided in contact with a diamond thin film generates electromotive force depending on a change in the temperature of the diamond thin film. Since a thermal effect exerted on the diamond thin film appears as a change in the temperature thereof, the thermo-electromotive element comes to output a thermal effect exerted on the diamond thin film as electromotive force.

Since a diamond thin film shows a very high thermal response, a change in the temperature thereof will reflect a thermal environment around the diamond thin film with a high fidelity. Consequently, an output from the thermo-electromotive element will also reflect a thermal environment accurately under which the diamond thin film is placed.

Such constitutions are applicable to a flow rate measuring device, temperature measuring device, fluid detection device, e.g., gas sensor, humidity sensor, and the like.

In accordance with another aspect of the present invention, the device of the present invention comprises a thermo-electromotive element provided on the surface of a diamond thin film, wherein a change in the temperature of the diamond thin film is output as a change in voltage through the thermo-electromotive element.

The above constitution is characterized in that electromotive force of a thermo-electromotive element becomes a change in voltage corresponding to a change in the temperature of a diamond thin film.

In accordance with a further aspect of the present invention, a device comprises a thermo-electromotive element provided on the surface of a diamond thin film, wherein the diamond thin film functions as an element for detecting the thermal effect from the environment and the thermo-electromotive element functions as an element for outputting the thermal effect.

The diamond thin film responds to the thermal effect exerted from the environment under which to be placed with an extreme sensitivity, which response appears as a change in the temperature of the diamond thin film. In such a case, the diamond thin film can be regarded as a thermally passive element. And, the thermo-electromotive element for detecting a change in the temperature of the diamond thin film and outputting the change as a electromotive force can be regarded as an element for outputting the thermal effect exerted on the diamond thin film.

As thermal effects from the environment can be mentioned the one attributable to the flow rate of a fluid flowing in contact with the diamond thin film, the one attributable to a difference in the kind of a fluid in contact with the diamond thin film, the one attributable to a difference in the concentration of impurities contained in the fluid in contact with the diamond thin film, the one attributable to a difference in humidity, and so on.

In accordance with a further another aspect of the present invention, a measuring device for functioning to convert a change in the quantity of heat into a change in voltage comprises a diamond thin film and a thermo-electromotive element formed on the surface of the diamond thin film, wherein an output corresponding to a change in the quantity of heat transferred through the diamond thin film is obtained from the thermo-electromotive element.

In the above configuration., the measuring device with a function to convert a change in the quantity of heat into a change in voltage means the measuring device having a function to output an output signal corresponding to a change in the quantity of heat transferred through the diamond thin film from the thermo-electromotive element as an electric signal (a change in voltage).

The quantity of heat transferred through a diamond thin film means the quantity of heat flowing into and flowing out of the diamond thin film.

This quantity of heat flowing into and flowing out of the diamond thin film accurately reflects a thermal status of the environment under which the diamond thin film is placed. Quantitatively estimating the in and out of this quantity of heat will enable the measurement of the flow rate of a fluid flowing in contact with the diamond thin film, that of a difference in the kind of a fluid in contact with the diamond thin film (e.g., gas detection), that of a difference in the concentration of impurities contained in a fluid in contact with the diamond thin film (e.g., gas concentration detection), that of humidity, and so on to be performed.

In accordance with still another aspect of the present invention, the device comprises: a diamond thin film; and a thermo-electromotive element formed on the surface of the diamond thin film; wherein a change in the temperature of the diamond thin film is converted into an electric signal by using the thermo-electromotive element.

Another constitution according to the present invention: a diamond thin film; a thermo-electromotive element formed on the surface of the diamond thin film; means for applying a pulsewise heating on the diamond thin film; and means for processing an output of the thermo-electromotive element, wherein a change in the temperature of the diamond thin film following a heating from the means for applying a pulsewise heating is converted into an electric signal by using the thermo-electromotive element.

In the above configuration, a resistive heating unit provided in contact with a diamond thin film, for example, can be mentioned as means for applying a pulsewise heating on the diamond thin film. This is a configuration for generating a pulsewise Joule's heat by forming a metal film material of Pt or the like on the surface of the diamond thin film with sputtering or vapor deposition and applying a predetermined voltage or current to the relevant film for a predetermined time.

As another means for applying a pulsewise heating can be mentioned a configuration for heating a diamond thin film by irradiating a laser ray or electromagnetic wave onto the diamond thin film. In adopting such a configuration, a significance can be obtained that heating a diamond thin film at a constant quantity of heat is possible independently of the temperature of a target to be measured or a measuring environment.

The above configuration is characterized in that a change in the temperature of the diamond thin film following a heating from pulsewise heating means is converted into an electric signal by using the thermo-electromotive element.

On the pulsewise heating of a diamond thin film, the diamond thin film exhibits an abrupt rise in temperature and is cooled after the finish of heating. This corresponds to a process that the quantity of heat flows into the diamond thin film on the pulsewise heating thereof and flows out from the surface thereof after the finish of heating.

Figure 3:
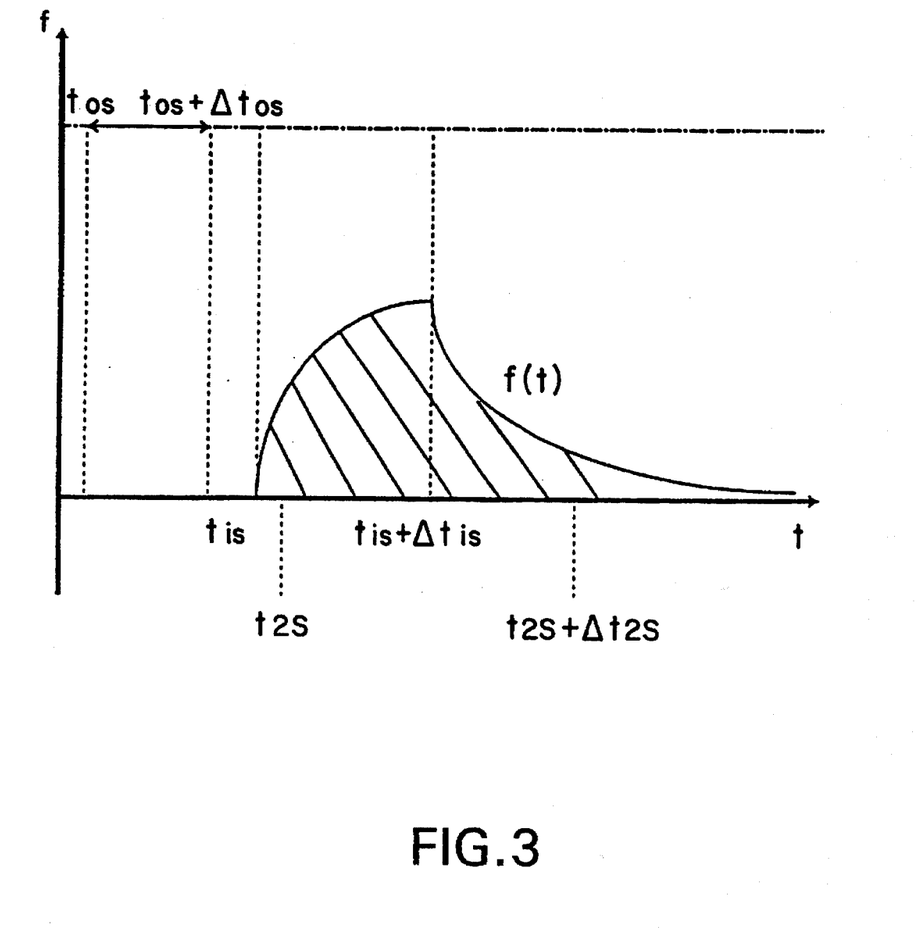
FIG. 3 shows an output waveform in operation of a flow-rate measuring device according to the embodiments.

This process of heating and cooling can be considered to indicate the response characteristic of a diamond thin film to a pulsewise heating. This response can be observed as such a wave form as shown in FIG. 3. In FIG. 3, the ordinate indicates an amplified value (voltage value) f of output from the thermo-electromotive element with an amplifier and the abscissa indicates the elapsed time t.

A value of f in the ordinate corresponds to the temperature of a diamond thin film, where a larger value of f indicates a higher temperature of the diamond thin film. As is indicated by the waveform function f(t), FIG. 3 shows circumstances that the diamond thin film exhibits an abrupt rise in temperature on pulsewise heating for $\Delta t_{1s}$ and is cooled abruptly after the finish of heating.

The response characteristic indicated by f(t) in FIG. 3 reflects the thermal effect exerted on a diamond thin film from the environment. For example, when a fluid (e.g., nitrogen gas fluid) is flowing in contact with a diamond thin film, the quantity of heat is carried away from the surface of the diamond thin film by the fluid. The quantity of heat carried away by this fluid depends on the flow rate or flow velocity of the fluid.

When applying a pulsewise heating to a diamond thin film with a predetermined quantity of heat for a predetermined time under these circumstances, the response waveform as indicated by f(t) of FIG. 3 varies with the flow rate. For example, with increasing flow rate, the quantity of heat to be carried away from the diamond thin film by a fluid becomes still greater and so the response waveform as indicated by f(t) of FIG. 3 contracts. This is because a rise in the temperature of a diamond thin film is suppressed and at the same time the rate of cooling thereof becomes more rapid.

Using the flow rate dependency of the response waveform indicated by f(t) of FIG. 3, measurements of the flow rate can be made. For example, from calculating the area between the response waveform as indicated by f(t) of FIG. 3 and the abscissa, a value of flow rate can be obtained. Furthermore, since this value corresponds also to the temperature of a fluid, the kind of a fluid, the concentration of impurities contained in a fluid, and the like, a temperature sensor, fluid sensor (e.g., gas sensor), further impurity concentration sensor, and humidity sensor can be implemented using this correspondence.

For quantitatively estimating the response waveform indicated by f(t) of FIG. 3, it is required to integrate the outputs from a thermo-electromotive element prior to the pulsewise heating; to integrate the outputs from a thermo-electromotive element after the pulsewise heating; and to compute the difference between the above two integrated values in means for processing an output from the thermo-electromotive element.

The above computation enables the area bounded by the response waveform indicated by f(t) of FIG. 3 to be accurately evaluated. As means for processing an output from a thermo-electromotive element, for example, a system composed of an A/D convertor for A/D converting an output from the thermo-electromotive element and a CPU for processing an A/D converted digital signal can be mentioned. Of course, as means for processing an output from this thermo-electromotive element, an integrated system of A/D convertor and CPU may be employed.

Examples of operations in means for processing an output from a thermo-electromotive element will be shown below. First, integrating the outputs from a thermo-electromotive element prior to the pulsewise heating is performed. Herein, an A/D converted output f (generally, to be amplified with an amplifier) from the thermo-electromotive element is computed in the CPU in accordance with the following equation for calculation:

$$S_{0s} = \int_{t_{0s}}^{t_{0s}+\Delta t_{0s}} f dt \quad \text{[equation 1]}$$

This arithmetic operation enables the standard for computing the area bounded by the response waveform as indicated by f(t) of FIG. 3 to be set. Setting this standard enables only the response waveform to be estimated.

Next, integrating the outputs from a thermo-electromotive element after the pulsewise heating is performed. Herein also, an A/D converted output f (generally, to be amplified with an amplifier) from the thermo-electromotive element is computed in accordance with the following equation for calculation:

$$S_{2s} = \int_{t_{2s}}^{t_{2s}+\Delta t_{2s}} f dt \quad \text{[equation 2]}$$

As shown in FIG. 3, the above computation is performed directly after the start of pulsewise heating to be performed within the time of $\Delta t_{1s}$, where $t_{2s}$ must meet the condition of $t_{1s} < t_{2s}$ for evading the occurrence of spiky noise.

After the finish of computation set forth by Equations 1 and 2, the difference between the two integrated value is evaluated in the CPU. This evaluation is made, for example, from the difference between $(S_{0s}/\Delta t_{0s})$ and $(S_{2s}/\Delta t_{2s})$.

The above computation enables only the response waveform indicated by f(t) of FIG. 3, that is, only the response to pulsewise heating applied to a diamond thin film, to be estimated.

In accordance with still a further aspect of the present invention, the device comprises: one conductive type layer provided on the surface of a diamond thin film; and a metal electrode provided in contact with the one conductive type layer; wherein the thermal effect exerted on the diamond thin film is determined by measuring the thermo-electromotive force generated between the one conductive type layer and the metal electrode.

In the above configuration, a p-type semiconductor layer is formed by inserting boron ions onto the surface of a diamond thin film and this p-type semiconductor layer with a metal electrode formed in contact with the surface thereof constitute a thermo-electromotive element. In this case, a Pt thin film formed with sputtering can be used as the metal electrode.

Also in adopting the above configuration, the thermal effect exerted on the diamond thin film can be output as a thermo-electromotive force of the thermo-electromotive element comprising a p-type diamond conductive layer and a metal electrode.

The above configuration can be used for a thermo-electromotive element according to another constitution of the present invention disclosed in the present specification.

In accordance with another aspect of the present invention, the device comprises: one conductive type layer provided on the surface of a diamond thin film; a metal electrode provided in contact with the one conductive type layer; means for applying a pulsewise heating to the diamond thin film; and means for determining the response characteristic of the diamond thin film following a pulsewise heating with the relevant heating means by measuring the thermo-electromotive force generated between the one conductive type layer and the metal electrode.

In the above configuration, a resistive heating element formed on the surface of the diamond thin film or heating means by irradiating a laser beam can be mentioned as means for pulsewise heating.

The response characteristic of a diamond thin film to a pulsewise heating is output as thermo-electromotive force through the thermo-electromotive element comprising one conductive type semiconductor layer (in general, p-type semiconductor layer) formed on the surface of the diamond thin film and a metal electrode provided in contact with the relevant semiconductor layer.

In accordance with another aspect of the present invention, a measure device of the present invention uses a thin film material, wherein the thin film material with its thermal conductivity $K_s$, specific heat $C_s$, and density $p_s$ at 300 K, has a square size of L=1 mm and a time constant $\tau$, defined by $\tau=(C_s\, p_s\, L^2/K_s\, \pi^2)$, smaller than 1 msec and a thermo-electromotive element is provided on the surface of the film material.

It is possible to use other film materials in place of a diamond thin film. In this case, high thermal conductivity materials, such as monocrystalline Si, polycrystalline Si, silicon carbide, aluminum nitride, boron nitride, and alumina, can be used in principle as thin film materials.

It is desirable as thin film materials to satisfy the following conditions: First, an equation for the response time (time constant) in heating a film material is shown without regard to the thickness in the following equation:

$$\tau = \frac{C_s p_s L^2}{K_s \pi}\qquad \text{[equation 3]}$$

The above Equation 3 gives a parameter ($\tau$) for estimating the time elapsed until the temperature distribution of a film material deprived of the quantity of heat by a fluid reaches a stationary state. The above Equation 3 is deduced on the basis of a 2-dimensional model, where the thickness of a material is not included as parameters. Also, no answer thereto indicate the response time of a film material directly. However, the answer can be used as indices for estimating the relative response time in heating various film materials.

Table 1 shows the list of response times ($\tau$) in heating various materials, evaluated using Equation 3.

TABLE 1

| Material name | Thermal conductivity $K_s$ (W/mK) | Specific heat $C_s$ (J/kgK) | Density $p_s$ (Kg/m$^3$) | Time constant $\tau$ (ms) |
|---|---|---|---|---|
| Diamond thin film | 1000 | 530 | 3510 | 0.6 |
| Monocrystal-line silicon | 148 | 767 | 2331 | 3.8 |
| Alumina (Al$_2$O$_3$) | 36 | 838 | 3990 | 30 |
| Sialon | 22 | 754 | 3000 | 33 |
| Silicon nitride (Si$_3$N$_4$) | 34 | 712 | 3180 | 21 |
| Silicon carbide (SiC) | 84 | 419 | 3000 | 4.8 |
| Cubic boron nitride (c-BN) | 1300 | 838 | 3480 | 0.7 |
| Aluminum nitride (AlN) | 350 | 750 | 3260 | 2.2 |

Samples are L = 1 mm square.
Subjects of examination are film-shaped and their thickness is disregarded.
The thermal response characteristic (time constant) of a film material is estimated in accordance with the following equation: $\tau = (C_s p_s L^2/K_s \pi)$ Physical characteristics of various materials shown in Table 1 are used for film materials as far as possible. However, for a film material with unknown physical characteristics like c-BN, theoretical values or values of a bulk material are employed. In addition, the values at room temperatures (300 K) are selected as a rule.

Table 1 reveals that the response time $\tau$ for diamond thin film and cubic crystal boron nitride is by far smaller. However, the measured thermal conductivity for polycrystalline cubic boron nitride is 600 (W/mK) in the order of magnitude (Artificial Diamond Technical Handbook, in Japanese, Science Forum), and at this time the time constant in Table 1 becomes 1.5 (msec) in the order of magnitude. And, a large value of 1700 (W/mK) is also reported as the thermal conductivity for vapor synthesized diamond thin film (Diamond thin film, in Japanese, Sangyo Tosho, written by Inuzuka) and the above time constant in Table 1 becomes still smaller if such a diamond thin film used.

The basic inventive configuration disclosed in the present specification is for the purpose of measuring the response characteristic in heating a film material. Consequently, the speed in the thermal response of a film material, that is the speed in the response to heating of a film material, becomes an important factor.

For example, if $\tau$ to be evaluated by using Equation 3 is 0.6 (msec) or under, a characteristic can be obtained as is equal or superior to that of the flow rate measuring sensor to be disclosed in the present invention.

Generally speaking, if a material with $\tau$ indicated by Equation 3 not greater than 1 (msec) is used, a flow rate measuring sensor having a practically sufficient characteristic can be obtained. However, if such problems as a fall in sensitivity, a decrease in dynamic range, a rise in consumption power, and an increase in measuring interval, are allowed, a material with $\tau$ not more than 5 (msec) can be used.

Of course it goes without saying that alumina and silicon nitride having a large $\tau$ can be used depending on problems of required characteristic or cost.

From these discussions it is concluded in a configuration for measuring the thermal effect exerted on a film material from the environment on the basis of the response characteristic of the relevant film material to pulsewise heating that the film material with a size of 1 mm square should have a parameter τ, indicated by Equation 3, being not more than 1 (msec) for an improvement in characteristics.

Needless to say, the prescription of a film material to be satisfied that is obtained by using Equation 3 is applicable to the configuration of another invention disclosed in the present specification.

For example, it is also possible to adopt a configuration wherein means for the pulsewise heating of a film material meeting the conditions obtained by using Equation 3 is placed and a thermo-electromotive element for measuring the response characteristic of the film material to pulsewise heating by the relevant means.

And, means for processing an output from a thermo-electromotive element is provided, in which the outputs from a thermo-electromotive element prior to the pulsewise heating and the outputs from a thermo-electromotive element after the pulsewise heating are integrated and the difference between the above two integrated values is computed, so that the above evaluation of the response characteristic can be carried out using FIG. 3.

The above evaluation enables the flow rate or flow velocity of a fluid flowing in contact with, and the kind of a fluid, the concentration of impurities contained in a fluid, and the temperature of a fluid in contact with the relevant film materials to be measured.

As substances to be measured in the inventions disclosed in the present specification, fluids can be mentioned first. As fluids, gas, liquid, atomized fluid, and powder-contained gas and liquid can be mentioned.

Or, as substances to be measured, solid materials can be chosen. When substances to be measured are solid, a way of temperature change in a solid film material to heating varies with a difference in thermal conductivity, specific heat, and heat capacity, thereby enabling the kind of a solid material to be identified or the size or volume thereof to be measured.

In accordance with another aspect of the present invention, the device comprises:

means for obtaining a first response characteristic dependent on parameters represented by $\alpha_1, \alpha_2 \ldots \alpha_n$;

means for obtaining a second response characteristic dependent on parameters represented by $\alpha_1, \alpha_2 \ldots \alpha_{n+1}$;

means for comparing the first response characteristic with the second response characteristic and obtaining an output dependent on a parameter represented by $\alpha_{n+1}$;

wherein the means for obtaining a first response characteristic and the means for obtaining a second response characteristic have the respective thermo-electromotive elements, and the first and second response characteristics are detected as a change in the temperature of a diamond thin film to pulsewise heating.

Figure 4:
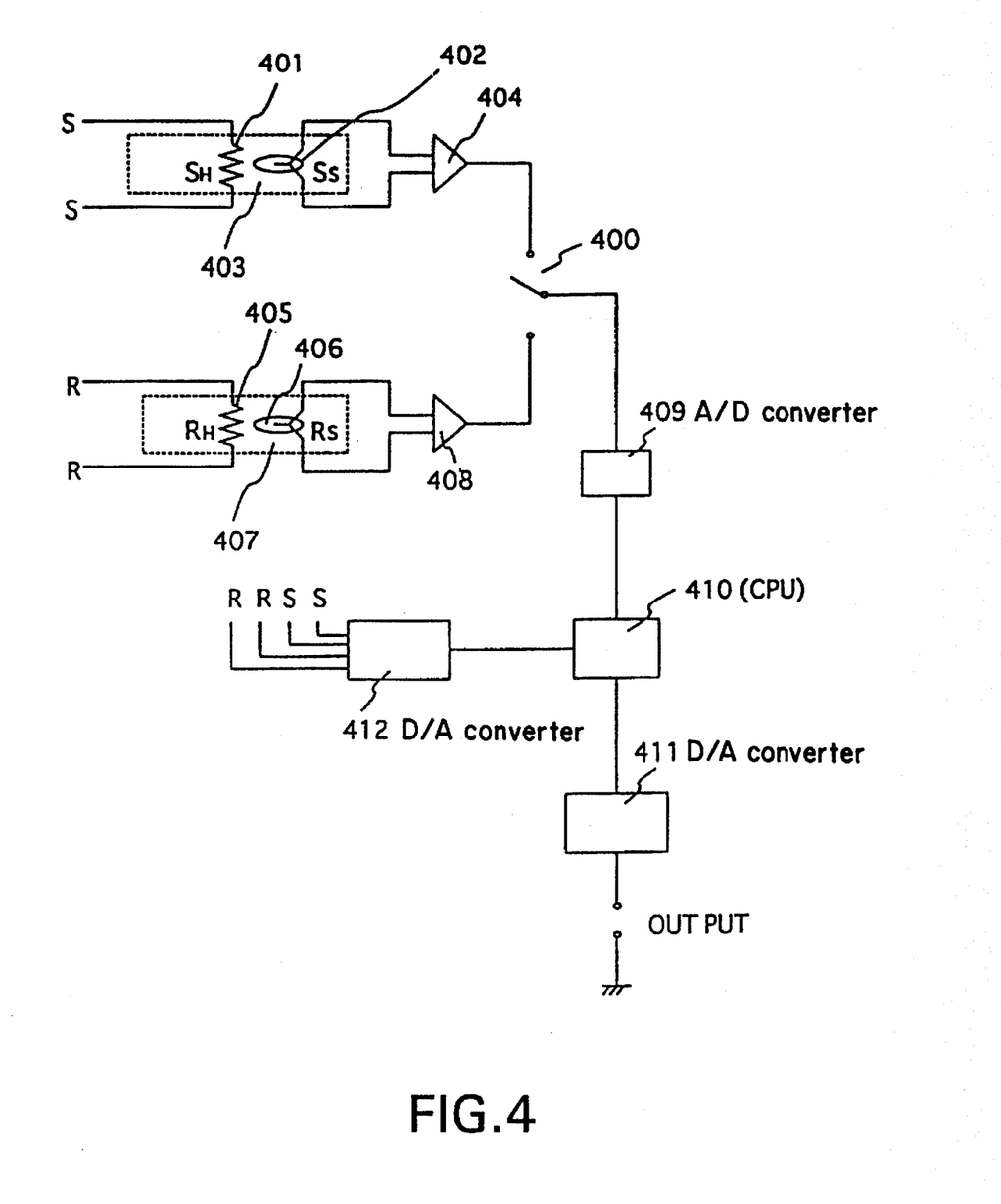
FIG. 4 shows the configuration of a flow-rate measuring device according to the embodiment 4.

As means for obtaining a first response characteristic dependent on parameters represented by $\alpha_1, \alpha_2 \ldots \alpha_n$, for example, the configuration designated by 406 in FIG. 4 can be mentioned. Numeral 406 in FIG. 4 denotes a thermo-electromotive element, which detects the response characteristic of the diamond thin film 407 to pulsewise heating from the heating unit 405 as a change in the temperature thereof.

As means for obtaining a second response characteristic dependent on parameters represented by $\alpha_1, \alpha_2 \ldots \alpha_{n+1}$, for example, the construction designated by 402 in FIG. 4 can be mentioned. Numeral 402 in FIG. 4 denotes a thermo-electromotive element, which detects the response characteristic of the diamond thin film 403 to pulsewise heating from the heating unit 401 as a change in the temperature thereof.

As means for comparing the first response characteristic with the second response characteristic and obtaining an output dependent on a parameter represented by $\alpha_{n+1}$, the CPU 410 shown in FIG. 4 can be mentioned. The CPU 410 functions to compare the respective response characteristics of the diamond thin films 403 and 407 to pulsewise heating output from the thermo-electromotive elements 402 and 406 of individual sensors and amplified by the amplifiers 404 and 408, and to compute an output dependent only on a single parameter represented by $\alpha_{n+1}$.

Using two or more sensors having the same characteristics, the above configuration obtains a first response dependent on parameters represented by $\alpha_1, \alpha_2 \ldots \alpha_n$ in at least one sensor and an output dependent on parameters represented by $\alpha_1, \alpha_2 \ldots \alpha_{n+1}$ in at least one of the other sensors, where n is a natural number represented by 1, 2, 3, ...

For example, in measuring the flow rate, the response characteristic of the diamond thin film to pulsewise heating contains information about such parameters as flow rate, fluid temperature, fluid density, fluid specific heat, and fluid kinematic viscosity. Generally, effects of such parameters as fluid density, fluid specific heat, and fluid kinematic viscosity are small and so becomes inessential when a large tolerance of measurements is allowed. If the tolerance of measurements is below several percents, however, these parameters come into question.

The above configuration is featured in canceling the effect of these parameters by comparison of the outputs from two sensors and obtaining an output related only to required parameters.

As the simplest example, the case of setting $\alpha_1$ and $\alpha_2$ in correspondence to fluid temperature and fluid flow rate with n=1 assumed in the above configuration can be mentioned. In this case, one sensor indicates a response dependent on $\alpha_1$, or fluid temperature, whereas the other one sensor indicates a response dependent on $\alpha_1$ and $\alpha_2$, or fluid temperature and fluid flow rate. On comparing these two responses, an output dependent only on the flow rate of a fluid can be obtained.

The respective responses are estimated by putting outputs from the thermo-electromotive elements into digital signals through aid of A/D converters and integrating the changing outputs therefrom in the CPU. That is, the response characteristics are estimated by calculating the area bounded by response waveforms. And, for comparison of two responses, it is only necessary to compute the difference or ratio between the integrated values of response waveforms. Incidentally, computations in the CPU are performed in accordance with the method mentioned above by using FIG. 3.

In this configuration, a film material with a variable τ defined by Equation 3 not greater than 5 msec, preferably not greater than 1 msec, can be used in place of a diamond thin film.

Function

In a configuration with a heating unit and thermo-electromotive element provided on the surface of a diamond thin film, the response characteristic of the diamond thin film to pulsewise heating can be accurately estimated at a small consumption power by applying a pulsewise heating to the diamond thin film from the heating unit and detecting a change in the temperature of the diamond thin film on the thermo-electromotive element. And, for example, the flow rate of a fluid flowing in contact with the diamond thin film can be accurately measured.

Furthermore, by using a film material with τ defined by Equation 3 not greater than 1 msec in place of a diamond thin film, the same characteristic can be obtained as with the diamond thin film.

DESCRIPTION OF THE PREFERRED EMBODIMENTS

Embodiment 1

In the present embodiment, the method for producing a sensor shown in FIG. 1 will be described. This sensor comprises a thermo-electromotive element made of a Pt thin film and Fe thin film formed on the surface of a diamond thin film vapor deposited. In such a configuration, the diamond thin film functions as detection section for detecting the thermal effect from the surrounding environment. To be concrete, the temperature of a diamond thin film reflects the thermal effect from the surrounding environment and a change in the temperature of the diamond thin film is obtained as a change in the output of a thermo-electromotive element.

In the sensor shown in FIG. 1, a heating unit 102 made up of a Pt thin film, and a Pt thin film pattern 103 and Fe thin film pattern 104 constituting a thermo-electromotive element are formed on the surface of a 5 mm n 5 mm polycrystalline diamond thin film 101, 5 μm in thickness. Numerals 105 and 106 denote electrodes of the heating unit 102 while Numerals 107 and 108 denote electrodes of the thermo-electromotive element, where the line width of each pattern is 100 μm, the size of each electrode portion is 600 μm square, and the linear portion of each pattern is 3 mm long.

The thermo-electromotive elements shown in FIG. 1, connected in series at three levels, takes a configuration in which a three fold larger electromotive force is obtainable than that of a single level configuration. In the configuration shown in FIG. 1, a plurality of junction portions denoted by 109 are heated by the heat generation of a heating unit 102 made up of a Pt thin film pattern and reaches a higher temperature than a plurality of junction portions denoted by 110, thereby generating a thermo-electromotive force between the electrodes 107 and 108.

Hereinafter, the production process of the sensor shown in FIG. 1 will be described. First, prepare an Si board of 4 cm diameter. Then, perform a damaging treatment on the to-be-formed surface of this Si board with diamond powder. Vapor deposit a diamond thin film, 5 μm thick, on this to-be-formed surface by the magnetic field microwave CVD. This magnetic field microwave CVD generates a high density plasma by using a strong magnetic field and 2.45 GHz microwave and performs a vapor deposition.

The film formation conditions are as follows:
Board temperature:800 K
Reaction pressure:0.25 Torr
Microwave power:4 KW
Reactant gas:$CH_3OH:H_2=1:4$
Film formation time:10 hr
Film thickness:5 μm With an Si board placed at the position of 875 G magnetic field intensity, a film was formed. The diamond thin film obtained under the above film formation conditions was a polycrystalline diamond thin film and had a structure of crystal growth perpendicular to the board.

The film formation method for obtaining a diamond thin film is not restricted to the above method, but other vapor deposition methods may be used. Native diamond or high-pressure synthesized diamond may be also used. Also, impurities may be doped into a diamond thin film for the control of thermal characteristic or electric characteristic. Furthermore, the crystal structure is not restricted to polycrystal but a monocrystalline diamond thin film may be used.

A diamond thin film is preferable which contains a small amount of impurities and has as high thermal conductivity as possible. The thickness of a diamond thin film would best be smaller so far as the mechanical strength permits if the productivity considered.

By peeling off the diamond thin film formed on the above Si board from the Si board, a single piece of diamond thin film can be obtained. This process can be easily accomplished by mechanical peeling or by dissolving the Si board with hydrofluoric acid.

The diamond thin film obtained in this way is cut into pieces of 5 mm square. Form Fe thin film patterns 104 on the obtained diamond thin film 101 by sputtering or by evaporation, then form Pt thin film patterns 103 by sputtering or by evaporation. Form a heating unit 102 simultaneously with the formation of Pt thin film patterns. These films are formed to a thickness of 2000 to 3000 Å. Thus, a sensor comprising the electrodes 105 and 106 of the heating unit and the electrodes 107 and 108 of the thermo-electromotive element can be obtained.

Operations of this sensor will be described. To operate this sensor, heat it by flowing a current through the heating unit 102 so that the junction portions denoted by 109 may be higher in temperature than the junction portions denoted by 110. At that time, the difference in temperature between the junction portions denoted by 109 and the junction portions denoted by 110 is determined by the quantity of heat conducting through the diamond thin film 101.

When a diamond thin film is in contact with a fluid, the quantity of heat conducting through the diamond thin film 101 is determined corresponding to the flow rate of the fluid. Accordingly, on heating the heating unit 102, the difference in temperature between the junction portions denoted by 109 and the junction portions denoted by 110 comes to correspond to the quantity of heat flowing in contact with the diamond thin film 101. Thus, the thermo-electromotive force between the electrodes 107 and 108 comes to correspond to the flow rate, or flow velocity, of a fluid flowing in contact with the diamond thin film 101. Incidentally, a fluid may flow in contact with any one surface or both surfaces of a diamond thin film.

The above case is an example of heat generation simply from the heating unit 102, but it is only necessary for obtaining a drift-free accurate measured value to perform a pulsewise heating from the heating unit 102. In this case, a change in the temperature of the diamond thin film 101, to which a pulsewise heating is applied, is detected in a form of difference in temperature between the junction portions 109 and 110 and comes to be output as thermo-electromotive force between the electrodes 107 and 108.

It can be understood that a change in the temperature of the diamond thin film 101, to which a pulsewise heating from the heating unit 102 is applied, is the thermal characteristic of the diamond thin film 101 to pulsewise heating.

It is important for the configuration shown in FIG. 1 that a heating unit and a thermo-electromotive element are provided on the diamond thin film and the thermal characteristic of the diamond thin film 101 to heating (in particular, pulsewise heating) is output as thermo-electromotive force from the thermo-electromotive element.

In addition, the shape of a thermo-electromotive element or a combination of materials thereof, further the shape or material of a heating unit, still further their arrangement can be changed or modified in conformity to the implementation.

As shown in the present embodiment, the consumption power can be greatly reduced by using a thermo-electromotive element as element for detecting the thermal response characteristic of a diamond thin film.

The sensor shown in FIG. 1 is used as a flow-rate sensor in the above case but can be applied also to a temperature sensor, a gas sensor, and other sensors.

Embodiment 2

The present embodiment refers to the operating method of the sensor shown in FIG. 1. The operating method to be described in the present embodiment comprises the steps of: applying a pulsewise heating to a diamond thin film; and detecting a change in the temperature of the diamond thin film to this pulsewise heating with a thermo-electromotive element formed on the surface of the diamond thin film.

On adopting such a configuration as the present embodiment, a change in the temperature of a diamond thin film to pulsewise heating reflects the thermal effect exerted from the surrounding environment on the diamond thin film. Consequently, the thermal effect exerted from the surroundings on a diamond thin film can be known from a change in the temperature of the diamond thin film to pulsewise heating. Since a change in the temperature of a diamond thin film to pulsewise heating can be understood to be the response characteristic of a diamond thin film to pulsewise heating, the above operation can be understood as determining a thermal effect exerted from the surroundings on the diamond thin film by measuring the response characteristic of the diamond thin film to pulsewise heating.

As the thermal effect exerted from the surroundings on a diamond thin film, the one attributable to the flow rate or flow velocity of a fluid flowing in contact with the relevant diamond thin film can be mentioned. In this case, because the quantity of heat escaped from a diamond thin film differs depending on the flow rate of a fluid flowing in contact with the relevant diamond thin film, the thermal effect exerted from the surroundings on a diamond thin film differs depending on the flow rate of a fluid flowing in contact with the relevant diamond thin film, accordingly the response characteristic of the diamond thin film to pulsewise heating comes to differ.

In this case, depending on the flow rate of a fluid flowing in contact with the diamond thin film, a change in the temperature of a diamond thin film to pulsewise heating, that is, the response characteristic of the diamond thin film to pulsewise heating, comes to differ. Thus, a quantitative estimation of this response characteristic enables the flow rate to be computed.

Figure 2:
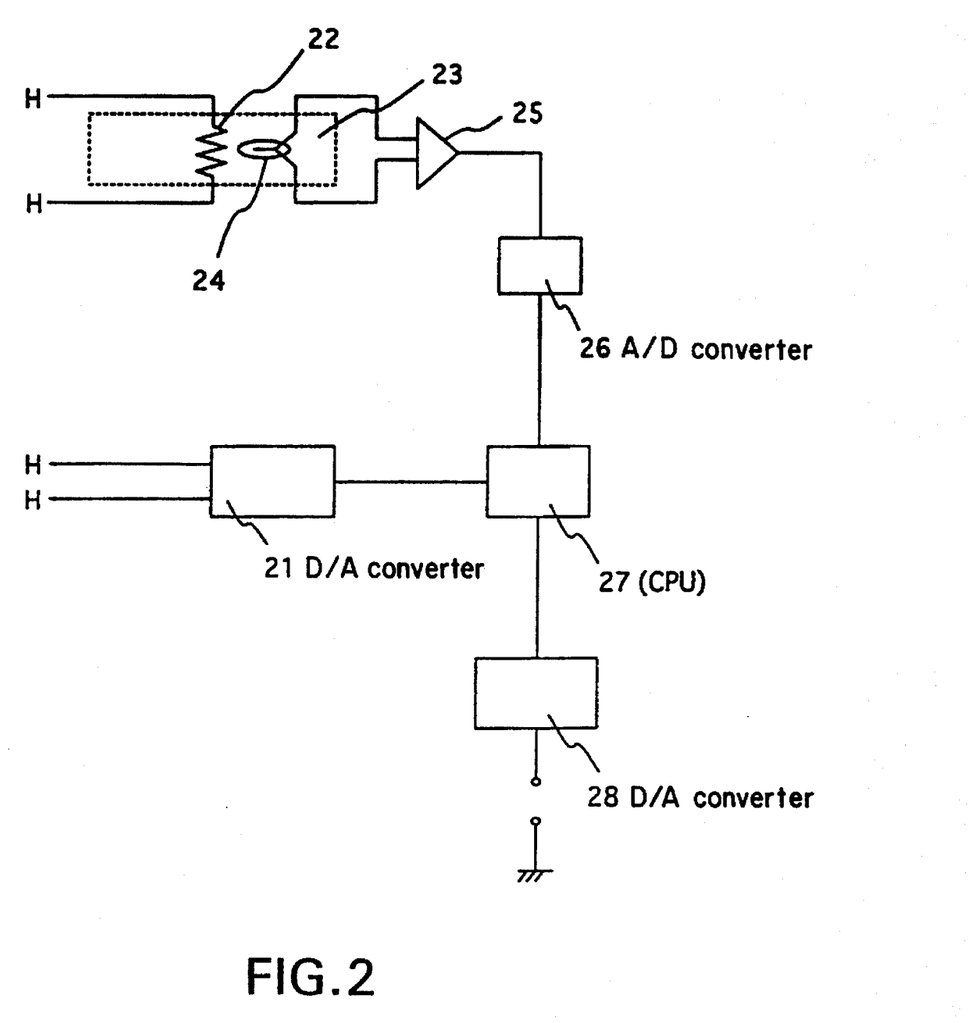
FIG. 2 shows the configuration of a flow-rate measuring device according to the embodiments 1 to 3, 7, 8.

FIG. 2 shows a system for measuring the flow rate (flow-rate device). In FIG. 2, Numeral 23 denotes a diamond thin film, on the surface of which a thermo-electromotive element 24 and heating unit 22 are provided. The structure of a sensor itself is the same as shown in FIG. 1. That is, the configuration of the thermo-electromotive element 24 and heating unit 22 is the same as shown in FIG. 1.

The response characteristic of the diamond thin film (a change in the temperature of a diamond thin film) following a pulsewise heating by the heating unit 22 is converted into EMF and output as a change in voltage, which output is voltage amplified with the amplifier 25 and converted into a digital signal on the A/D converter 26. This digital signal is processed in the CPU 27 in accordance with a predetermined calculation method. The processed signal is converted into an analog signal on the D/A converter 28 and output as a value corresponding to a measured value of flow rate.

The D/A converter 21, provided for pulsewise heat generation to be effected from the heat unit 22, is controlled by the CPU 27. This D/A converter 21 functions to apply a predetermined voltage or current to the heating unit 22 for a predetermined period at the required timing.

Hereinafter, one operating example of the system shown in FIG. 2 will be described. First, assume the diamond thin film is in contact with a fluid. In this case, it is only necessary to allow a fluid in contact with any one surface or both surfaces of the diamond thin film. As a fluid, gas, liquid, mixed fluid of gas and liquid, powder-contained gas, atomized fluid, or the like can be dealt with.

FIG. 3 shows a change in output from the amplifier 25 during one time operation. Output f from the amplifier 25 can be the to be a parameter representing the temperature of the diamond thin film 23. Thus, FIG. 3 can be the to indicate how the temperature of the diamond thin film 23 varies during one time operation.

First, with a fluid kept in contact with the diamond thin film, process an output f from the amplifier 25 of a digital signal converted with the A/D converter 26 in the CPU 27 in accordance with the Equation 1.

The calculation is performed to determine the standard for measurement in one time operation. This standard is used to cancel a change in the temperature of the diamond thin film (temperature drift) accompanying the elapse of time for each time of measurement.

Next, supply voltage for $\Delta t_{1s}$ to the heating unit 22 from D/A converter 21 to cause a pulsewise heat generation for $\Delta t_{1s}$ on the heating unit 22. The diamond thin film 23 is heated rapidly by this a pulsewise heat generation on the heating unit 22 and cooled rapidly by a fluid after the finish of heating. This change in the temperature of the diamond thin film 23 is detected with the thermo-electromotive element 24 and output as a change in voltage. An output from the thermo-electromotive element 24 is voltage amplified with the amplifier 25 and becomes an output f. In this case, an output f from the amplifier 25 changes, in the form as is shown in FIG. 3, corresponding to a change in the temperature of the diamond thin film.

Directly after the start of heating from the heating unit 22, an output f from the amplifier 25 of a digital signal converted with the A/D converter 26 is processed in the CPU 27 in accordance with the Equation 2.

In the above calculation processing, it is assumed that $\Delta t_{1s} < \Delta t_{2s}$. This is because noise appears in the output f if $\Delta t_{1s} = \Delta t_{2s}$.

Furthermore, compute the difference between the integrated value $S_{0s}$ defined by Equation 1 and the integrated value $S_{2s}$ defined by Equation 2. This calculation is fulfilled by employing either $(\Delta t_{0s}/\Delta t_{2s}) S_{2s} - S_{0s}$ or $(\Delta t_{2s}/\Delta t_{0s}) S_{0s} - S_{2s}$. In these calculation methods, since evaluating the difference is important, the inverse sequence is also possible.

The hatched area made by a response waveform in FIG. 3 can be evaluated by finding the difference between the above integrated value $S_{0s}$ and integrated value $S_{2s}$. The area represented by the hatched portion in FIG. 3 depends only on the response of the diamond thin film 23 to pulsewise heating during $\Delta t_{1s}$ and therefore evaluating this area enables an accurate response of the diamond thin film to be evaluated.

A value of area made by this response waveform depends on the quantity of a fluid flowing in contact with the diamond thin film and therefore the flow rate of a fluid flowing in contact with the diamond can be computed from this value.

Embodiment 3

The present embodiment refers to the mechanism of a flow-rate measuring device for enabling the temperature compensation by basically utilizing the configuration shown in FIG. 2.

In the device shown in FIG. 2, when only the temperature of a fluid changes, an output from the device also comes to change without any change in the flow rate of a fluid flowing in contact with the diamond thin film 23. This originates in the fact that a resistance value of the heating unit 22 varies with the temperature of a fluid and consequently the heating value comes to change depending on the temperature of a fluid.

For solving the problem mentioned above, a mechanism is only necessary which prevents the heating value from the heating unit 22 from changing depending on a change in the temperature of the fluid and/or measuring environment. According to the knowledge of the inventors, if a constant flow rate is supplied to the diamond thin film, the response characteristic of the diamond thin film to pulsewise heating depends on almost nothing but the flow rate or flow velocity of the fluid rather than the temperature of the fluid.

For implementing the above mechanism in the configuration shown in FIG. 2, it is only necessary to use a material having the smallest possible temperature dependency of resistance value (the smallest possible temperature coefficient) as the heating unit. As such a material, constantan (alloy of Ni45%-Cu55%) can be mentioned. Because of its extremely small temperature coefficient, constantan exhibits hardly any change in resistance value with changing temperature of the fluid and/or measuring environment. Consequently, when applying a constant voltage for a definite period, an almost constant heating value can be obtained independently of the temperature of the fluid and/or measuring environment.

Thus, a change (response characteristic) in the temperature of the diamond thin film 23, obtained on pulsewise heating from the heating unit 22, comes to depend almost exactly on the flow rate of the fluid flowing in contact with the diamond thin film 23.

The operating method (measuring method) of a device according to the present embodiment is all the same as the method shown in the embodiment 2.

Embodiment 4

The present embodiment refers to the mechanism of a flow-rate measuring device for enabling the temperature compensation by basically utilizing the configuration shown in FIG. 2. FIG. 4 is a block diagram illustrating the outline of the present embodiment. The configuration according to the embodiment 4 shown in FIG. 4 is for the purpose of implementing an accurate measurement of the flow rate by facilitating the provision of two sensors identical in configuration, using one sensor as a flow-rate measuring sensor (denoted by S), using the other sensor as a temperature measuring sensor (denoted by R), and comparing the outputs from both sensors.

As each sensor, a sensor having the same configuration as shown in FIG. 1 can be used. In addition, the operation of each sensor is also similar to that described in the embodiment 2.

It is important for the configuration shown in FIG. 4 to keep the temperature measuring sensor not in contact with a fluid and to keep the flow-rate measuring sensor in contact with a fluid. In such a configuration, the difference between output from a temperature measuring sensor and output from a flow-rate measuring sensor lies in whether a sensor is in contact with a fluid.

This can be considered as follows: it can be considered that output from a temperature measuring sensor depends on various parameters $\alpha_1, \alpha_2 \ldots \alpha_n$ and a flow-rate measuring sensor depends on various parameters $\alpha_1, \alpha_2 \ldots \alpha_{n+1}$, where the parameter $\alpha_{n+1}$ corresponds to the flow of a fluid, e.g., flow rate.

In brief, two sensors are identical and their circumstances different only in whether or not they are in contact with a fluid, in other words, being affected by the flow of a fluid and therefore output of each sensor differs only relative to the parameter $\alpha_{n+1}$ corresponding to this flow.

In the above, various parameters means not a few parameters, such as flow rate or flow velocity of a fluid, viscosity of a fluid, density of a fluid, specific heat of a fluid, kinematic viscosity of a fluid, and the like, relative to a fluid.

Here, on comparing the outputs of two sensors, only the output component relative to $\alpha_{n+1}$ is not canceled and left. That is, only the output component corresponding to the flow rate can be obtained which does not pertain to other various parameters.

Output comparison between the above two sensors is performed by obtaining the output difference or output ratio.

In the configuration shown in FIG. 4, the flow-rate measuring sensor comprises a thermo-electromotive element 402 and a heating unit 401 formed on the surface bf the diamond thin film 403. An output from the flow-rate measuring sensor (i.e., output from the thermo-electromotive element 402) is amplified by the amplifier 404.

The temperature measuring sensor comprises a thermo-electromotive element 406 and a heating unit 405 formed on the surface of the diamond thin film 407. An output from the temperature measuring sensor (i.e., output from the thermo-electromotive element 406) is amplified by the amplifier 408.

Outputs from two sensors are input to the A/D converter 409 via the switch 400. The A/D converter 409 converts the input signal into a digital signal. The digitalized signal is input to the CPU 410 and a predetermined calculation is performed. This predetermined calculation is basically the same as that shown in the embodiment 2. It is assumed that the operation of the temperature measuring sensor and that of the flow-rate measuring sensor are the same and their output processing methods are exactly the same.

In the configuration shown in FIG. 4, the difference from those shown in the embodiment 2 is in operation of processing an output from the temperature measuring sensor and processing an output from the flow-rate measuring sensor for one-time flow measurement. That is, an operation in the embodiment 4 is double the operation in the embodiment 2.

The D/A converter 412 functions to apply current to the heating unit 401 in the flow-rate measuring sensor and to the heating unit 405 in the temperature measuring sensor at an appropriate time. And, current to be applied to each heating unit is preferably in a constant-current mode. This is in order that the heating value increases with elevating temperature, thus improving the measuring sensitivity.

The CPU 410 compares outputs from two sensors and computes the output component dependent only on the flow rate of a fluid flowing in contact with the flow-rate measuring sensor. Thus, an analog output is obtained from the D/A converter 411.

On adopting the configuration of the present embodiment, an accurate measurement of the flow rate can be performed in spite of a change in the temperature of a fluid or the content of impurities. For example, in measuring the flow rate of air flowing through the air conditioner duct, the flow rate can be measured independently of the temperature or humidity of air flowing through the duct.

Embodiment 5

Figure 5:
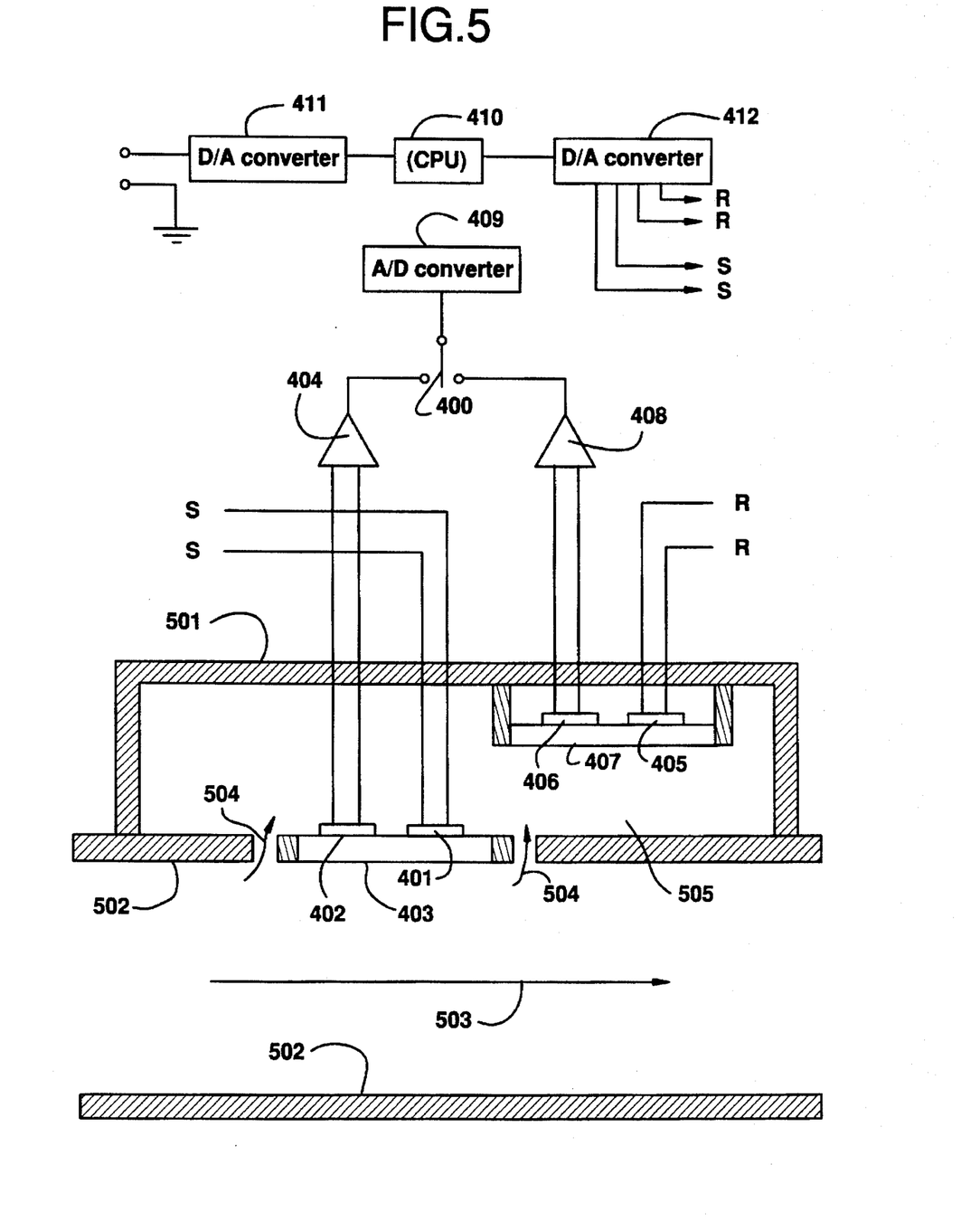
FIG. 5 shows the configuration of a flow-rate measuring device according to the embodiment 5.

The present embodiment is one example of placing the configuration of the embodiment 4 inside a pipe through which a fluid is flowing. FIG. 5 shows the schematic configuration of the present invention. The configuration shown in FIG. 5 is equivalent to that shown in FIG. 4 and is for the purpose of measuring the flow rate of the flow of a fluid flowing through the plastic or iron pipe 502. In a part of the pipe 502, the diamond thin film 403 constituting the flow-rate measuring sensor is inserted. As indicated by Numeral 504, it is so constructed part of a fluid is flowed into the closed space 505 from the opening. Consequently, the diamond thin film 407 constituting the temperature measuring sensor is in contact not with a flowing fluid but with a stagnant fluid.

By adopting the configuration shown in FIG. 5, only the component corresponding to the flow rate becomes different between output from the flow-rate measuring sensor and output from the temperature measuring sensor.

That is, the thermal effects detected by the respective sensors differs only relative to the flow of the fluid.

Incidentally, the diamond thin films 403 and 407 need to be held with material that can be regarded as thermally insulating.

Embodiment 6

The present embodiment refers to the configuration in which the flow-rate measuring device shown in the embodiment 2 has been improved in such a manner as to enable the temperature compensation. With changing temperature of the fluid and/or the measuring environment, a resistance value of the heating unit also changes and accordingly the heating value thereof changes, so that an accurate measurement cannot be performed. For solving this problem, there is a method for using a material having the lowest possible temperature dependency as a heating unit for the pulsewise heating of the diamond thin film as shown in the embodiment 3. The present embodiment provides a configuration for changing the voltage supplied to the heating unit corresponding to the temperature of the fluid and/or the measuring environment and for enabling a constant quantity of heat or the corresponding quantity of heat to the temperature to be always supplied.

The concept of always supplying a constant quantity of heat and that of supplying a corresponding quantity of heat to temperature contradict each other but, as far as the inventors know, a measuring accuracy of more than a definite level can be obtained from the standpoint of either concept. This seems attributable to the fact that no theory is completed with all parameters of a fluid taken into consideration.

Figure 6:
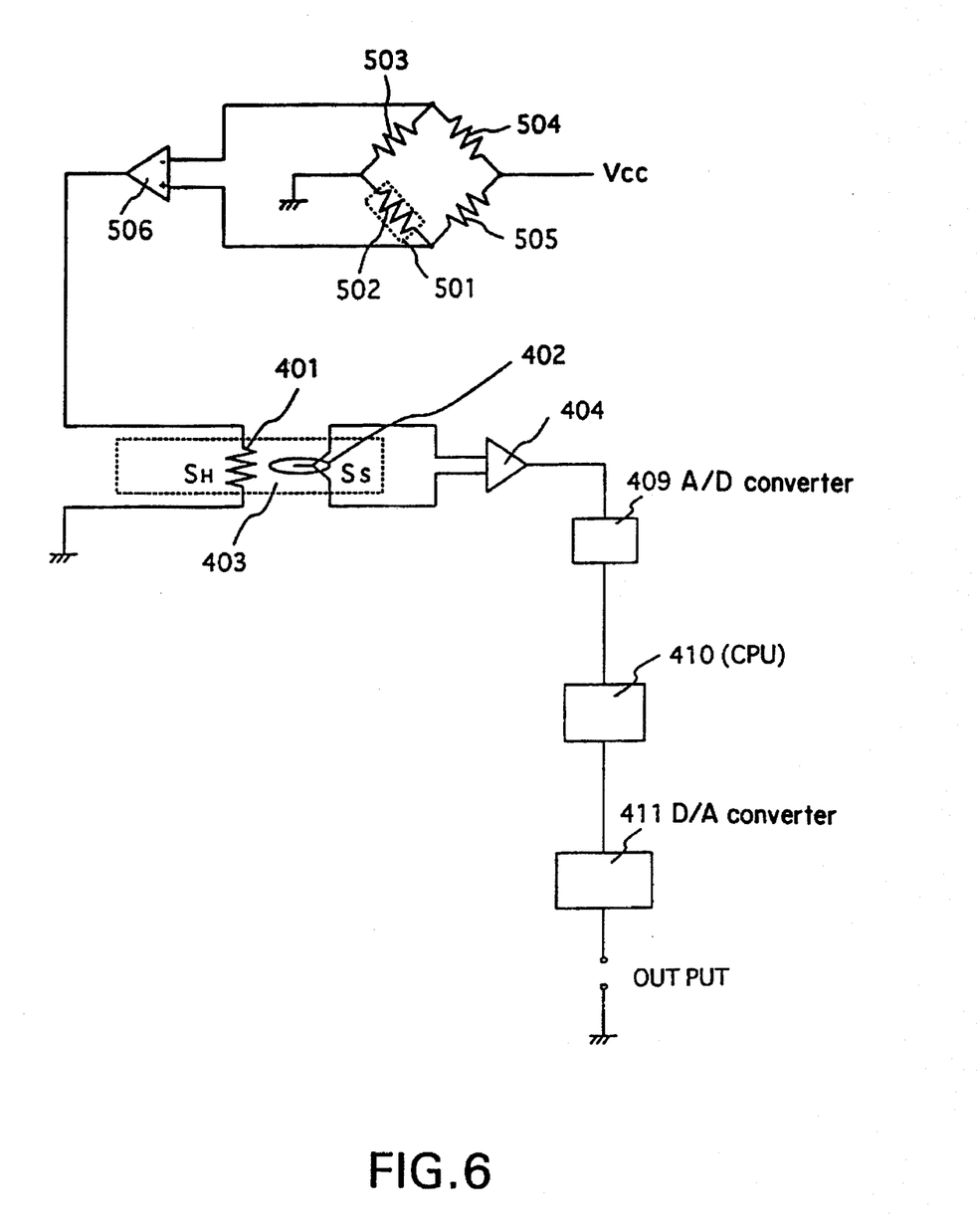
FIG. 6 shows the configuration of a flow-rate measuring device according to the embodiment 6.

FIG. 6 shows the schematic configuration of the present embodiment. In FIG. 6, to measure the flow rate, a flow-rate measuring sensor comprising a heating unit 401 and a thermo-electromotive element 402 formed on the surface of a diamond thin film 403 in the form as shown in FIG. 1. The heating unit 401 of this flow-rate measuring sensor is driven by an output of a bridge composed of a temperature measuring resistor 502, made of the same material as with the heating element 401, formed on the surface of a diamond thin film 501, and a resistors 503 to 505. In addition, the diamond thin film 501 on which the temperature measuring resistor 502 formed need to be in contact with a fluid. In this case, the diamond thin film may be in direct contact with a fluid or may be in contact like the temperature measuring sensor shown in FIG. 5.

An output from the thermo-electromotive element 402 is amplified with the amplifier 404 and input to the A/D converter 409. To a signal digitalized in the A/D converter 409, a predetermined processing is applied in the CPU 410 and output as the flow rate or as an analog signal corresponding to a value of flow rate from the D/A converter 411. The calculation performed in the CPU 410 is the same as shown in the embodiment 2.

It will be described on the configuration shown in FIG. 6 how the temperature compensation is made. For example, when the heating unit 401 and temperature measuring resistor 502 are made of Pt thin films, consider circumstances in which the temperature of a fluid rises. In this case, resistance of the temperature measuring resistor 502 increases with increasing resistance of a fluid, and accordingly voltage amplified by the amplifier 506 becomes larger. On the other hand, the resistance of the heating element 401 increase with a rise in the temperature of a fluid. As a result, the quantity of heat can be made much the same or corresponding to the temperature of a fluid.

Embodiment 7

The present embodiment refers to an example in which a thermo-electromotive element composed of semiconductor and metal is provided on the surface of a diamond thin film. The thermo-electromotive element can be implemented using a combination of metal-semiconductor. The present embodiment shows a combination of Pt and Si semiconductor.

First, prepare a diamond thin film through the method shown in the embodiment 1 and form an amorphous Si semiconductor film on the surface of this diamond thin film by using the plasma CVD. The amorphous Si semiconductor film may be formed in the pattern denoted by 104 in FIG. 1. It is useful to use a crystalline Si semiconductor film in place of a amorphous Si semiconductor film.

Then, form a Pt thin film in the pattern denoted by 103 in FIG. 1. Furthermore, make up a heating unit 102 also of Pt thin film at this time. In this way, a thermo-electromotive element comprising Si semiconductor and Pt is constructed.

Embodiment 8

The present embodiment refers to an example in which a p-type semiconductor layer is formed on the surface of a diamond thin film and a thermo-electromotive element comprises the relevant semiconductor and Pt. First, prepare a diamond thin film by using the plasma CVD as shown in the embodiment 1. Then, perform an ion insertion of B (boron) by ion insertion or plasma doping and form a p-type diamond semiconductor layer on the surface of the diamond thin film.

This p-type semiconductor layer is formed in the pattern denoted by 104 in FIG. 1. Then, form a Pt thin film in the pattern denoted by 103 and make up a heating element denoted by 102 of Pt thin film. Thus, a sensor having a thermo-electromotive element composed of p-type diamond semiconductor and Pt can be obtained.

Embodiment 9

The present embodiment refers to an example in which a thermo-electromotive is constructed in a pattern different from that of the sensor shown in FIG. 1. Unless otherwise stated, the same symbols as shown in FIG. 1 denote like places.

Figure 7:
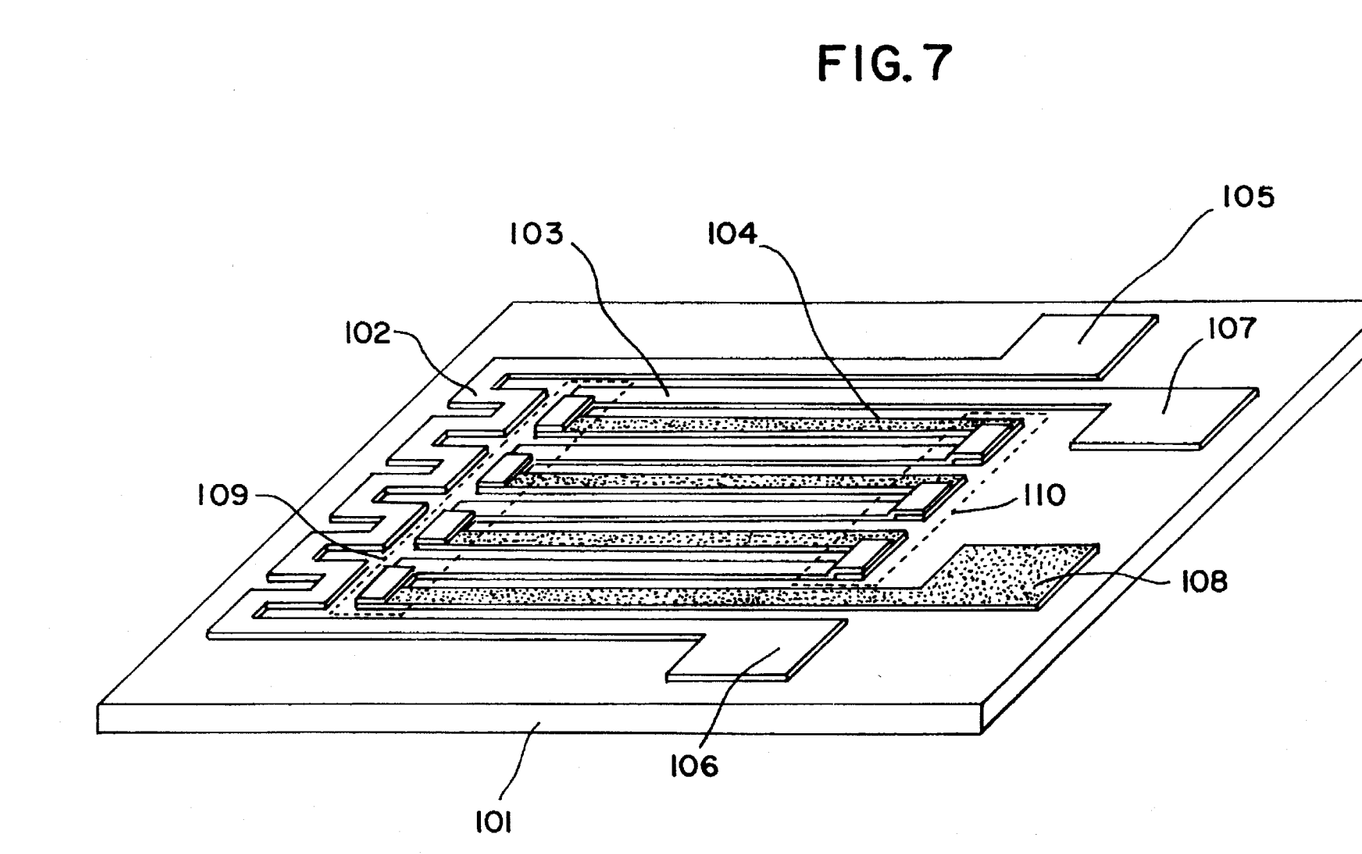
FIG. 7 shows the configuration of a sensor according to one example of the embodiment 9.
Figure 8:
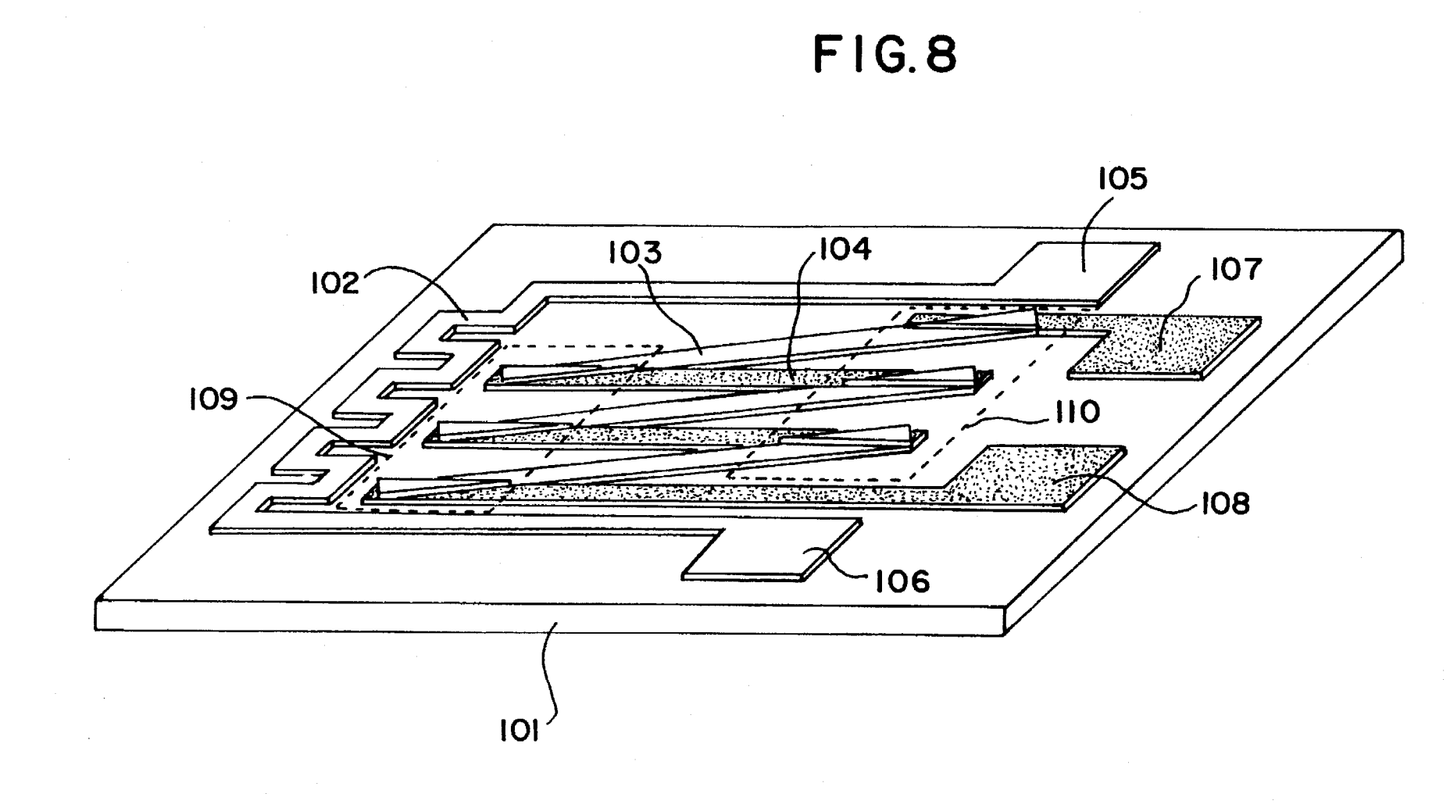
FIG. 8 shows the configuration of a sensor according to another example of the embodiment 9.

FIG. 7 shows one example of the present embodiment. This example differs from the configuration shown in FIG. 1 in that the junction portions 110 are fewer by one than the junction portions 109. FIG. 8 shows another example, featured in that the configuration pattern of a thermo-electromotive element becomes simple.

The consumption power of a thermal sensor using a diamond thin film can be reduced by detecting a change in the temperature of the diamond thin film with the aid of a thermo-electromotive element.

What is claimed is:

1. A measuring device comprising:
   a diamond thin film;
   a thermo-electromotive element formed on the surface of said diamond thin film;
   means for applying a pulsewise heating on said diamond thin film; and
   means for processing an output of said thermo-electromotive element,
   wherein a change in the temperature of said diamond thin film following a heating from said means for applying a pulsewise heating is converted into an electric signal by using said thermo-electromotive element.

2. The measuring device of claim 1 wherein a change in the temperature of said diamond thin film depends on the flow rate or flow velocity of a fluid flowing in contact with the diamond thin film.

3. The measuring device of claim 1 wherein a change in the temperature of said diamond thin film depends on the kind of a fluid in contact with the diamond thin film.

4. A measuring device comprising:
   one conductive type layer provided on the surface of a diamond thin film; and
   a metal electrode provided in contact with said one conductive type layer;
   means for applying a pulsewise heating to said diamond thin film; and
   means for determining the response characteristic of said diamond thin film following a pulsewise heating with the relevant heating means by measuring the thermo-electromotive force generated between said one conductive type layer and said metal electrode.

5. The measuring device of claim 4 wherein the response characteristic depends on the flow rate or flow velocity of a fluid flowing in contact with the diamond thin film.

6. A measuring device comprising:
   means for obtaining a first response characteristic dependent on parameters represented by $\alpha_1, \alpha_2 \ldots \alpha_n$;
   means for obtaining a second response characteristic dependent on parameters represented by $\alpha_1, \alpha_2 \ldots \alpha_{n+1}$;
   means for comparing said first response characteristic with said second response characteristic and obtaining an output dependent on a parameter represented by $\alpha_{n+1}$;
   wherein said means for obtaining a first response characteristic and said means for obtaining a second response characteristic have the respective thermo-electromotive elements, and
   said first and second response characteristics are detected as a change in the temperature of a diamond thin film to pulsewise heating.

7. A measuring device comprising:
   means for obtaining a first response characteristic dependent on parameters represented by $\alpha_1, \alpha_2 \ldots \alpha_n$;
   means for obtaining a second response characteristic dependent on parameters represented by $\alpha_1, \alpha_2 \ldots \alpha_{n+1}$;
   means for comparing said first response characteristic with said second response characteristic and obtaining an output dependent on a parameter represented by $\alpha_{n+1}$;
   wherein said means for obtaining a first response characteristic and said means for obtaining a second response characteristic have the respective thermo-electromotive elements,
   said first and second response characteristics are detected as a change in the temperature of a diamond thin film to pulsewise heating, and
   said film material with its thermal conductivity $K_s$, specific heat $C_s$, and density $P_s$ at 300 K, has a size of L=1 mm square and a time constant $\tau$, defined by $\tau=(C_s p_s L^2/K_s \pi^2)$, not greater than 1 msec.

8. A measuring device comprising:
   means for obtaining a first response characteristic dependent on parameters represented by $\alpha_1, \alpha_2 \ldots \alpha_n$;
   means for obtaining a second response characteristic dependent on parameters represented by $\alpha_1, \alpha_2 \ldots \alpha_{n+1}$;
   means for comparing said first response characteristic with said second response characteristic and obtaining an output dependent on a parameter represented by $\alpha_{n+1}$;
   wherein said means for obtaining a first response characteristic and said means for obtaining a second response characteristic have the respective thermo-electromotive elements, said first and second response characteristics are detected as a change in the temperature of a diamond thin film to pulsewise heating, and said film material with its thermal conductivity $K_s$, specific heat $C_s$, and density $p_s$ at 300 K, has a size of L=1 mm square and a time constant $\tau$, defined by $\tau=(C_s p_s L^2/K_s\pi^2)$, not greater than 5 msec.

9. The measuring device of claims 6, 7 or 8 wherein n=1, $\alpha_1$ is a parameter corresponding to the temperature of a fluid and/or that of the measured environment, and $\alpha_2$ is a parameter corresponding to the flow rate or flow velocity of a fluid.

10. A measuring device comprising:

a diamond thin film;

a thermo-electromotive element formed on the surface of said diamond thin film;

means for applying a pulsewise heating on said diamond thin film; and means for processing an output of said thermo-electromotive element, wherein a change in the temperature of said diamond thin film following a heating from said means for applying a pulsewise heating is converted into an electric signal by using said thermo-electromotive element; and wherein means for processing an output from the thermo-electromotive element integrates the outputs from a thermo-electromotive element prior to the pulsewise heating, integrates the outputs from a thermo-electromotive element after the pulsewise heating, and computes the difference between the above two integrated values.

11. A measuring device using a film material wherein said film material with its thermal conductivity $K_s$, specific heat $C_s$, and density $p_s$ at 300 K, has a size of L=1 mm square and a time constant $\tau$, defined by $\tau=(C_s p_s L^2/K_s\pi^2)$, not greater than 1 msec, and a thermo-electromotive element is provided on the surface of said film material, the measuring device including:

means for the pulsewise heating of the film material; and means for processing an output from the thermo-electromotive element;

wherein said means for processing an output from the thermo-electromotive element integrates the outputs from a thermo-electromotive element prior to the pulsewise heating and the outputs from a thermo-electromotive element after the pulsewise heating, and computes the difference between the above two integrated values.

12. The measuring device of claim 11 wherein the difference between the two integrated values corresponds to the flow rate or flow velocity of a fluid flowing in contact with the film material.

13. The measuring device of claim 11 wherein the difference between the two integrated values corresponds to the kind of a fluid in contact with the film material.

* * * * *